(No Model.)
F. O. & H. P. SPALDING.
VEHICLE POLE IRON.
No. 421,202. Patented Feb. 11, 1890.
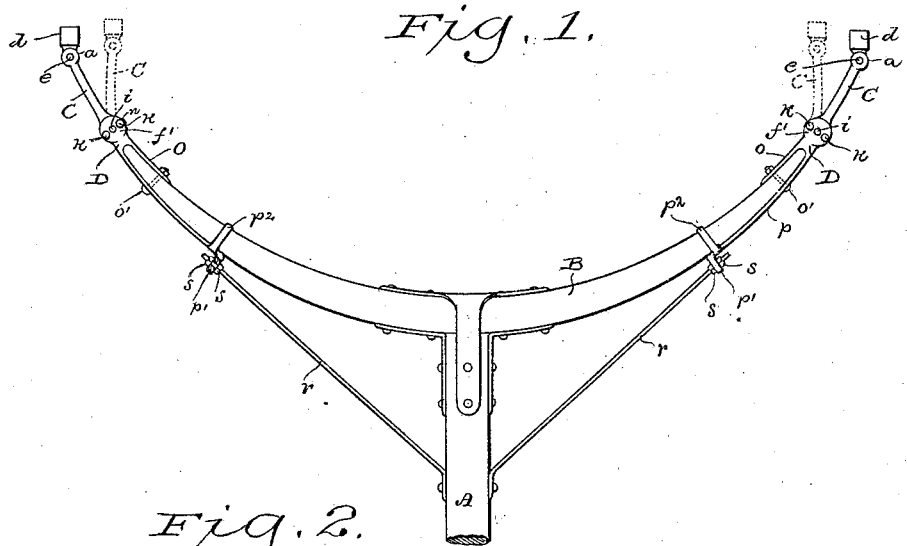
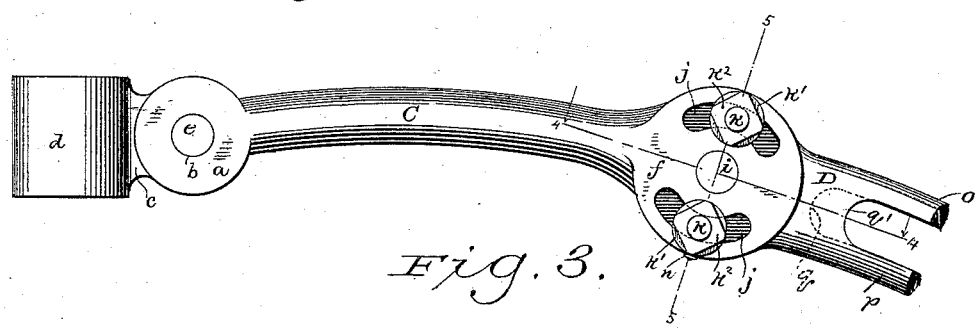
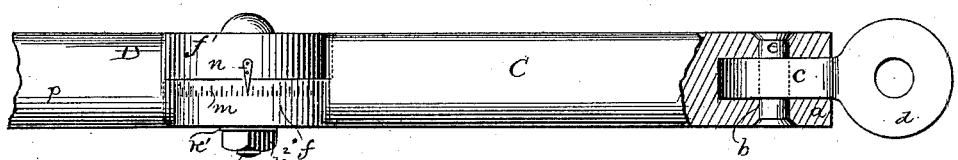
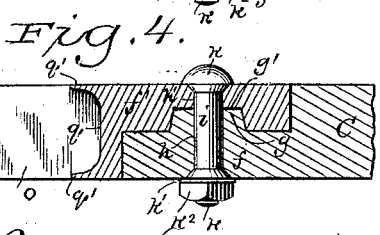
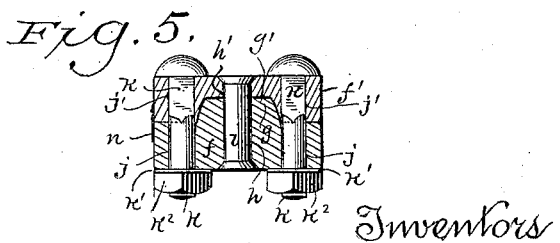
Witnesses
Geo. W. Young
Wm Klug
Inventors
Frederic O. Spalding
Harrison P. Spalding
By Stout & Underwood
Attorneys

UNITED STATES PATENT OFFICE.

FREDERIC O. SPALDING AND HARRISON P. SPALDING, OF MILWAUKEE, WISCONSIN.

VEHICLE-POLE IRON.

SPECIFICATION forming part of Letters Patent No. 421,202, dated February 11, 1890.

Application filed June 17, 1889. Serial No. 314,585. (No model.)

*To all whom it may concern:*

Be it known that we, FREDERIC O. SPALDING and HARRISON P. SPALDING, of Milwaukee, in the county of Milwaukee, and in the State of Wisconsin, have invented certain new and useful Improvements in Vehicle-Pole Irons; and we do hereby declare that the following is a full, clear, and exact description thereof.

Our invention relates to vehicle-pole irons; and it consists in certain peculiarities of construction, as will be fully set forth hereinafter, and subsequently claimed.

In the drawings, Figure 1 is a plan view of a vehicle-pole and cross-bar with our improvements applied thereto. Fig. 2 is an under side plan view, and Fig. 3 a side view, of our device, partly broken away. Fig. 4 is a detail section on the line 4 4, and Fig. 5 a like view on the line 5 5 of Fig. 2.

A represents a vehicle-pole, and B a cross-bar of ordinary construction attached thereto by any usual means, as shown.

Our improved irons are formed with a shank C, terminating at the rear end in a bifurcated circular disk $a$, with central vertical bore $b$, the former receiving the shank $c$ of the eye $d$ and the latter receiving the pivot $e$, passed down through said bore $b$ and a hole in the shank $c$ registering therewith, and being upset at each end, as shown, the disk $a$ being preferably countersunk about each end of the bore $b$. The lower forward end of the shank C terminates in a circular disk $f$, of about half the height of the shank C and having a central hub $g$ projecting up still higher, and having a central bore $h$, about whose outer end the disk is preferably countersunk, and the disk $f$ receives a similar disk $f'$, projecting from the upper rear end of the socket-iron D and having a central recess $g'$, corresponding to the hub $g$ of the disk $f$, and a central bore $h'$, registering with the central bore $h$ in the under disk $f$, the disk $f'$ being preferably countersunk about the outer end of the bore $h'$, and the two disks united by the pivot $i$, which is then upset at each end, the countersinks in the disks $f$ and $f'$ enabling these upset ends to be flush with the disk, (like the upset ends of the pivot $e$, shown flush with the bifurcated disk $a$,) thereby making a much neater and more attractive appearance than would be possible without countersinking the disks. The disk $f$ is provided with two segmental slots $j\ j$ and the disk $f'$ with two vertical perforations $j'\ j'$ for the reception of the adjusting screw-bolts $k\ k$, having suitable washers $k'$ and nuts $k^2$, whereby all are tightened to place after adjustment. This adjustment (of one disk upon the other) is facilitated by means of the scale $m$ upon the side of one of the disks and the pointer or index-finger $n$ on the other disk.

The socket-irons D are each provided with a short arm $o$ and a long arm $p$, between which the ends of the cross-bar B pass into sockets $q$, there being flanges or webs $q'\ q'$, of metal, extending from one arm to the other at these points to guard against the ends of the cross-bar slipping out of the sockets $q$. The long arm $p$ of each socket-iron D terminates in an outwardly-turned lug $p'$ with a central perforation, and just before this end there is an inwardly-projected ring or collar $p^2$, formed with or secured to said arm $p$, and the ends of the cross-bar B pass through these collars or rings $p^2$ and then into the sockets $q$, and then screw-bolts $o'$ are passed through holes in the two arms and interposed cross-bar and secured by nuts, as shown in Fig. 1. The holes in the lugs $p'$ receive the screw-threaded ends of braces $r$, (whose other ends are secured to the pole A,) there being nuts $s\ s$ on the braces $r$ on each side of the lugs $p'$ to hold the parts all firmly together. The pole and cross-bar are attached to a vehicle by means of the described eyes $d\ d$, which receive the bolts of shackles secured to the front axle or other forward portion of the vehicle.

The operation of our device will be readily understood from the foregoing description of its construction. Suppose, for instance, it is desired to use the pole with a narrower (or wider) vehicle than the one for which it has been adjusted. It is only necessary to detach the cross-bar (by taking out the bolts in the eyes $d$) and then to loosen the nuts $k^2\ k^2$, when the disks $f$ can be quickly turned inward (or outward) on the pivots $i$, (the slots $j$ permitting this movement,) and then (when the shanks C are in the position shown in dotted lines in Fig. 1, for instance) the nuts are again tightened and the device is ready for attachment to the other vehicle. It this way only one pole is necessary for a variety of vehicles, and the device will be found particularly useful to livery-stable keepers, as a change can be quickly made from one wagon to another, or even from a wagon or carriage to a sleigh, if desired, and by reason of the described scale and index-finger the changes can be very quickly and accurately made when the dimensions have been once determined.

Having thus described our invention, what we claim as new, and desire to secure by Letters Patent, is—

1. In a vehicle-pole iron, the combination, with the socket-iron having projecting arms at its forward end and an upper vertically-perforated disk at its rear end, of a shank having a pivoted attaching-eye at its rear end and a lower segmentally-slotted disk at its forward end pivoted to the socket-iron disk, one of said disks having a scale on its side edge and the other disk carrying an index-finger, and adjusting-screws passing through the vertical perforations in one disk and the slots in the other, substantially as set forth.

2. In a vehicle-pole iron, the combination, with a socket-iron terminating at its rear end in an upper disk with a central under side recess and a central perforation, of a shank having at its rear end a pivoted attaching-eye and at its forward end a lower disk having a central hub fitting said recess of the upper disk, and a central perforation registering with the central perforation in the upper disk, both disks being countersunk about the outer ends of their central perforations and united by a pivot passed through said perforations and upset at each end flush with the outer surfaces of said disks, substantially as set forth.

3. The combination, with a vehicle-pole and cross-bar, of socket-irons having adjustable shanks pivoted to their rear ends, with pivoted eyes for attachment to a vehicle, and arms of different lengths projecting from their forward ends, the longer arms carrying rings or collars for the reception of the said cross-bar, and the two arms being united by flanges or webs of metal extending from one arm to the other to guard against the ends of the cross-bar slipping out of the sockets, substantially as set forth.

4. The combination, with a vehicle-pole and cross-bar, of socket-irons having adjustable shanks pivoted to their rear ends, with pivoted eyes for attachment to a vehicle, and arms of different lengths projecting from their forward ends, the longer arms carrying rings or collars for the reception of the said cross-bar and united to the shorter arms by socket guards or flanges and terminating in projecting perforated lugs, braces secured to said pole and having screw-threaded ends passing through said perforated lugs, and nuts on said braces on each side of said lugs, substantially as set forth.

In testimony that we claim the foregoing we have hereunto set our hands, at Milwaukee, in the county of Milwaukee and State of Wisconsin, in the presence of two witnesses.

FREDERIC O. SPALDING.
HARRISON P. SPALDING.

Witnesses:
H. G. UNDERWOOD,
WM. KLUG.